(12) United States Patent
Manninger

(10) Patent No.: US 11,142,325 B2
(45) Date of Patent: Oct. 12, 2021

(54) DEVICE AND METHOD FOR EJECTING A PARACHUTE

(71) Applicant: DRONE RESCUE SYSTEMS GMBH, Graz (AT)

(72) Inventor: Markus Manninger, Kumberg (AT)

(73) Assignee: DRONE RESCUE SYSTEMS GMBH, Graz (AT)

( * ) Notice: Subject to any disclaimer, the term of this patent is extended or adjusted under 35 U.S.C. 154(b) by 278 days.

(21) Appl. No.: 16/318,538

(22) PCT Filed: Jul. 20, 2017

(86) PCT No.: PCT/AT2017/060182
§ 371 (c)(1),
(2) Date: Jan. 17, 2019

(87) PCT Pub. No.: WO2018/014064
PCT Pub. Date: Jan. 25, 2018

(65) Prior Publication Data
US 2019/0315474 A1    Oct. 17, 2019

(30) Foreign Application Priority Data

Jul. 21, 2016 (AT) .............................. A 50665/2016

(51) Int. Cl.
*B64D 17/80* (2006.01)
*B64D 17/54* (2006.01)

(52) U.S. Cl.
CPC ............. *B64D 17/80* (2013.01); *B64D 17/54* (2013.01); *B64C 2201/185* (2013.01)

(58) Field of Classification Search
CPC ........ B64D 17/80; B64D 17/54; B64D 17/70; B64C 2201/185; A63H 33/20; A63H 27/004; F41B 7/00
USPC ............................ 124/17, 21, 32; 446/49–54
See application file for complete search history.

(56) References Cited

U.S. PATENT DOCUMENTS

| 1,465,835 A |   | 8/1922 | Atkinson |
|---|---|---|---|
| 4,008,541 A | * | 2/1977 | Russer .................. A63H 33/20 446/51 |

(Continued)

FOREIGN PATENT DOCUMENTS

| CN | 202 609 086 | 12/2012 |
|---|---|---|
| CN | 103 895 870 | 7/2014 |

(Continued)

OTHER PUBLICATIONS

Int'l Search Report (Form PCT/ISA/210) conducted in Int'l Appln. No. PCT/AT2017/060182 (dated Oct. 5, 2017).

(Continued)

*Primary Examiner* — Richard R. Green
*Assistant Examiner* — Madison Elizabeth Dittner
(74) *Attorney, Agent, or Firm* — Greenblum & Bernstein, P.L.C.

(57) ABSTRACT

The invention relates to a device (1) for ejecting a parachute, comprising a housing (2) with an ejection opening (3), wherein the housing (2) is suitable for at least partially accommodating the parachute. In order to enable a robust and repeated ejection of the parachute with a low weight of the device (1), according to the invention a movable base (4) is arranged within the housing (2), which base (4) is connected to the housing (2) via at least one spring element, wherein the base (4) can be releasably fixed in place within the housing (2) using a fixing means (5), wherein the device (1) is configured such that if a parachute is arranged within the housing (2), the base (4) is accelerated by the spring element when the fixing means (5) is released, so that the parachute is ejected through the ejection opening (3) by means of the base (4). Furthermore, the invention relates to a method for ejecting a parachute.

23 Claims, 6 Drawing Sheets

(56) References Cited

U.S. PATENT DOCUMENTS

Figure 1:
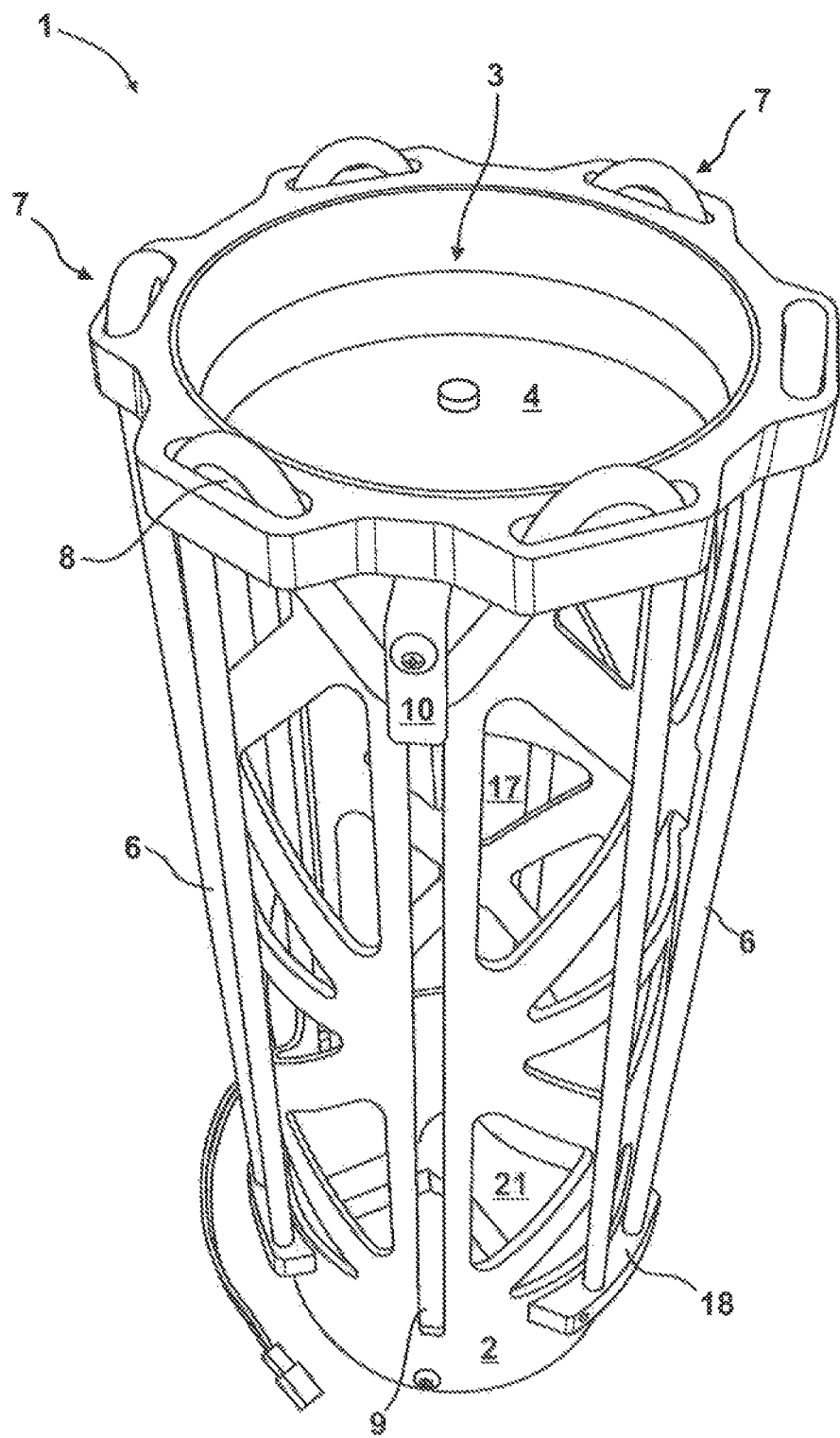

| | | | | |
|---|---|---|---|---|
| 4,033,528 | A | * | 7/1977 | Diggs .................... B64D 17/80 |
| | | | | 244/139 |
| 4,050,657 | A | | 9/1977 | Murphy |
| 5,671,722 | A | * | 9/1997 | Moody .................... F41B 7/00 |
| | | | | 124/17 |
| 5,826,827 | A | * | 10/1998 | Coyaso .................. B64D 17/80 |
| | | | | 244/139 |
| 5,979,424 | A | * | 11/1999 | Alvarez .................... F41B 7/08 |
| | | | | 124/16 |
| 6,471,160 | B2 | * | 10/2002 | Grieser .................. B64D 17/80 |
| | | | | 244/138 R |
| 7,448,371 | B2 | * | 11/2008 | Sapir ...................... F41B 3/005 |
| | | | | 124/16 |
| 2001/0048050 | A1 | | 12/2001 | Grieser |
| 2008/0296434 | A1 | * | 12/2008 | Yan ........................ B64D 17/80 |
| | | | | 244/139 |
| 2016/0318615 | A1 | * | 11/2016 | Pick ...................... B64C 39/024 |
| 2017/0225792 | A1 | | 8/2017 | Wang et al. |

FOREIGN PATENT DOCUMENTS

| | | |
|---|---|---|
| CN | 204 937 514 | 1/2016 |
| CN | 204937514 | 1/2016 |
| DE | 100 26 469 | 1/2002 |
| FR | 3 012 423 | 5/2015 |
| JP | S 34-006430 | 7/1959 |
| JP | H05-75096 | 10/1993 |
| SU | 157223 | 9/1963 |
| WO | 2016/025444 | 2/2016 |

OTHER PUBLICATIONS

Written Opinion Form PCT/ISA/237) conducted in Int'l Appln. No. PCT/AT2017/060182 (dated Oct. 5, 2017).
Russia Office Action conducted in counterpart Russia Appln No. 2019102812/11 (dated Sep. 15, 2020).
Japan Office Action conducted in counterpart Japan Appln. No. 2019-503477 (dated Feb. 26, 2021).

* cited by examiner

DEVICE AND METHOD FOR EJECTING A PARACHUTE

The invention relates to a device for ejecting a parachute, comprising a housing with an ejection opening, wherein the housing is suitable for at least partially accommodating the parachute.

Furthermore, the invention relates to a method for ejecting a parachute.

Devices and methods of the type named at the outset are known from the prior art, for example, in order to ensure a soft landing for aerial vehicles with failing propulsion units so that damage to the aerial vehicles and to objects on the ground can be avoided.

With devices from the prior art, an ejection of the parachute, which is typically connected to the housing via a cord, takes place by means of a servomotor supplied by an energy network of the aerial vehicle or by means of a gas pressure that is, for example, supplied in replaceable $CO_2$ cartridges. Devices of this type have several disadvantages. For example, if a triggering is activated by a servomotor, an ejection of the parachute is not possible if an on-board energy network fails. If pressure storage devices such as $CO_2$ cartridges are used to eject the parachute on demand, a replacement of the pressure storage device is required after the parachute has been ejected.

Thus, devices of this type are in particular not suitable for a vigorously growing market of unmanned, cost-effective and small flying objects such as flying drones, since in the case of flying drones of this type, it is often not possible to ensure failure protection for the on-board energy network and a replacement of pressure storage devices after an ejection of the parachute is undesirable, especially because a rapid redeployment is not possible as a result thereof.

This is addressed by the invention. The object of the invention is to specify a device of the type named at the outset which can be used reliably and also repeatedly without elements being replaced.

Furthermore, a method of the type named at the outset is to be specified which enables a reliable and repeated ejection of the parachute.

According to the invention, the first object is attained with a device of the type named at the outset in which a movable base is arranged within the housing, which base is connected to the housing via at least one spring element, wherein the base can be releasably fixed in place within the housing using a fixing means, wherein the device is configured such that if a parachute is arranged within the housing, the base is accelerated by the spring element when the fixing means is released, so that the parachute is ejected through the ejection opening by means of the base.

Within the scope of the invention, it was identified that a reliable ejection of the parachute that is also independent of an external energy source is possible if the energy needed for the ejection is stored in a pre-tensioned spring element. Thus, only the fixing means of the base must be released for the triggering, whereupon the base is accelerated by means of the energy stored in the spring element, wherein the parachute is ejected. Furthermore, the device is readily reversible and/or repeatedly deployable if, after a landing, the base is manually fixed in place again at the bottom end within the housing under tension of the spring element using the fixing means, for example. The device according to the invention is thus particularly suitable for cost-effective, unmanned flying drones, though a use of the device is not limited to flying drones of this type.

The spring element can basically be embodied in any desired manner. To achieve a particularly low weight of the device with a simultaneously robust design, it has proven effective that the spring element comprises an elastic band, in particular a rubber band, or is composed of one or more rubber bands. In this manner, a reduced weight of the device is achieved compared to a steel spring, for example. At the same time, an elastic band, in particular a rubber band, has proven advantageous in regard to material fatigue, so that a constant ejection force can be ensured even with frequent use of the device. This is beneficial for achieving a rapid opening of the parachute, so that an aerial vehicle can still be safely lowered to the ground by means of the parachute even when the parachute is not triggered until a lower altitude.

The housing can be embodied in widely varying ways. Typically, the housing is embodied such that it is suitable for keeping the parachute in a normally folded state in a position relative to the base such that the parachute can be ejected by means of the base. It is preferred that the folded parachute can be entirely accommodated within the housing. The housing can be embodied in a closed manner to protect the parachute, or with openings or as a grating to reduce the weight.

Advantageously, it is provided that the elastic band is guided over a redirection means which preferably comprises a roller. In this manner, the elastic band can, in a tensioned state in which the base is fixed in place by the fixing means, be stretched to a total length that exceeds a total length of the device. Thus, even with a compact design of the device, an ejection force required for an ejection can be ensured.

It is clear that a wide range of different designs is thereby possible. For example, the elastic band can be connected to the housing in a fixed manner at one end, guided over a redirection means that is also connected to the housing, and connected in a fixed manner at a second end to the base. However, a circumferential band can also be used which is not connected in a fixed manner to either the base or the housing, but rather is solely connected to the base and housing via redirection means in order to yield the force between the base and housing that is required for an ejection of the parachute.

A change in length of the elastic band during an ejection operation normally corresponds to a distance that the base travels within the device when the parachute is ejected. If a redirection means for the elastic band is provided, a relative elongation of the elastic band during a tensioning of the device and/or during a bottom-end fixing of the base in place within the housing can be reduced so that damage to the elastic band caused by stretching strain during frequent use can be prevented in a simple manner.

It is beneficial if the base can be moved relative to the housing between two end positions. It is thus ensured that the base remains with or inside the housing even in an ejection of the parachute. Typically, the end positions are defined by stops on a guide in which the base is guided within the housing.

To achieve a compact, lightweight and simultaneously reliable device, it is beneficial if the at least one spring element is arranged on the outside of the housing and is connected to the base via guide pins of the base that are guided in guides of the housing and protrude out of the housing. Since the guide pins of the base in this embodiment also constitute points of application for the spring element, additional components are eliminated so that the device can furthermore be produced in a particularly cost-effective manner.

For achieving a particularly compact design, it is beneficial if the housing is embodied in a roughly cylindrical manner and multiple spring elements are distributed at regular intervals over a circumference. Furthermore, the base is then accelerated very evenly by the spring elements, so that an even movement of the base within the housing is ensured and a jamming of the base within the housing is reliably prevented even in the case of small gap dimensions.

To achieve a sufficiently large ejection force or a required ejection distance even with a small footprint, it is preferably provided that the spring element has a pre-tension at each base position. In this manner, an acceleration of the parachute by the base moved or accelerated by means of the spring element is continuously possible, for example, from a first stop all the way to a second stop. If an elastic band is used as a spring element, this can be achieved particularly easily by guiding the band around a redirection means. For this purpose, for example, the elastic band can be attached at one end in a fixed manner to the base and at another end in a fixed manner to the housing at a bottom-end position of the housing, and can be guided over a redirection means positioned at the top-end with the housing, in order to achieve a lightweight, robust and particularly compact design with a high ejection force.

It is clear that the pre-tension of the spring element typically decreases during an ejection of the parachute in a movement of the base from a bottom end of the housing to a top end of the housing, at which top end the ejection opening is located, and is at a maximum when the base is fixed in place at the bottom end using the fixing means.

A reliable release of the fixing means is possible in a simple manner if the fixing means comprises a form-fitting connecting element, in particular a catch or a cam that engages in a corresponding notch in order to hold the base against a tension of the spring element. For example, on an underside of the base, a mandrel with a notch can be provided, in which notch a catch or a cam engages when the base is fixed in place, in order to hold the base against a tension force of the spring element(s) at the bottom end using the fixing means.

Typically, the device is embodied such that a release of the fixing means is possible electromagnetically. Since compared to devices from the prior art, there thus only needs to be an electromagnetic release of the fixing means and not an electromagnetic ejection of the parachute, an actuation of the device is possible with significantly less electrical energy. For example, a catch or a cam of a form-fitting connecting element can be embodied such that it can be actuated by the electromagnet, in order to achieve a release of the fixing means with a small amount of energy.

For achieving a particularly light and small device, it is beneficial if a lever mechanism, in particular a toggle lever, is provided to release the fixing means. An electromagnet can then be used which, for example, has a particularly small footprint and with which only a small force can be generated, since the force generated by the electromagnet is transmitted via the lever mechanism in order to achieve a robust release of the fixing means.

If a toggle lever is used, the device is normally embodied such that the base can be fixed in place within the housing by the toggle lever when the toggle lever is in an overextended position. In the case of a toggle lever, an overextended position is achieved by a movement past a dead center to a toggle lever stop into a stable position so that the toggle lever is locked. The toggle lever stop can, for example, be formed by a stop in an actuator which powers the toggle lever, such as an electromagnet. In this manner, large tension forces of the spring element can also be held by means of the toggle lever, or braced via the toggle lever stop, simply and without an expenditure of energy. To release the fixing means, the toggle lever is then moved, simply and with a minimal exertion of force, from the overextended position below dead center into an unstable position, so that the base is accelerated by the spring element and a parachute is ejected.

If a toggle lever is used, only a small amount of energy is needed for the triggering, since the toggle lever only needs to be moved from an overextended position into an unstable position, so that an energy storage device for the triggering can also be embodied to be small and light.

It is advantageous if an energy storage device is provided with which a release of the fixing means is possible without an additional external energy supply. This enables a particularly reliable ejection of the parachute even with an electromagnetic release of the fixing means independently of an external energy supply. For example, the energy storage device can be embodied as a storage battery that is charged before deployment or during operation using an on-board network of a vehicle to which the device is connected, for example, using an on-board network of a flying drone.

Particularly where a toggle lever is used as explained above, the energy storage device can also be embodied as a capacitor in order to enable a particularly small and lightweight construction, especially since an energy requirement for the triggering is small when a toggle lever is used. A use of a capacitor has, among other things, the advantage that the capacitor is completely charged immediately after connection to an on-board network of a vehicle to which the device is connected. In contrast thereto, a completely charged state is normally not reached until after several minutes or hours if a storage battery is used. Of course, instead of a capacitor, any other type of an, in particular, capacitive energy storage device can also be used.

It is beneficial if a radio receiver is provided and is connected to the fixing means such that the fixing means can be released by means of a radio signal. Thus, in the case of a remote-controlled flying drone, the parachute can easily be triggered by manual or automated remote control if, for example, it is foreseeable that damage would otherwise be unavoidable.

It has proven beneficial that at least one accelerometer is provided which is operatively connected to the fixing means such that the fixing means is released when an acceleration that exceeds a defined value is measured. Thus, for example, an automated ejection of the parachute can be achieved when an object to which the device is connected is in a critical state, for example, in free fall. The device can be embodied such that the defined value can be set as desired or is permanently preset.

Normally, an accelerometer can also be used as an inclinometer. However, a separate inclinometer can of course also be provided as a supplement, in order to identify a critical state with high reliability and to be able to trigger the parachute early enough. In this context, other sensors known from the prior art can of course also be provided in order to determine state variables relevant for a parachute triggering, such as a height over ground, weather conditions, a state of charge and/or fill level of an energy storage device for a propulsion unit and the like. In particular, a barometric altimeter can be provided in order to determine an altitude, changes in altitude as well as a vertical speed and a vertical acceleration.

It is beneficial if a data processing device is provided with which a release of the fixing means can take place in an automated manner. As a result, a wide range of different states can be defined in which the fixing means is released and the parachute is ejected. A simple and flexible adaptation of the device to the most widely varying objects, in particular different aerial vehicles, is thus possible, which objects have various permissible operating conditions. Normally, the data processing device is embodied as a microcontroller, so that the device can be designed in a space-saving manner and with a low weight and low energy requirements.

Normally, a data storage device is provided in which maximum value data, in particular regarding maximum accelerations, are stored, wherein sensors for determining current corresponding data during operation are provided, wherein the device is configured such that the fixing means is released when it is determined by means of the data processing device that data currently being measured exceed stored maximum value data. Thus, sensors for determining widely varying data such as a current flying altitude, a speed, weather conditions and the like, could be provided, and these data could be used for the automated triggering of the parachute. In this manner, damage to an aerial vehicle, to objects on the ground and injuries to people on the ground can be avoided effectively in an automated manner with a device according to the invention.

In this context, it is beneficial if the data processing device is configured to determine and store data, in particular accelerations, that occur during normal operation of an object to which the device is connected. In this embodiment, it is therefore not necessary to define the permissible maximum value data beforehand; instead, the device is thereby capable of determining permissible maximum value data itself. A self-learning device is thus achieved, as a result of which the device can, for example, be effectively used both on an object that moves at high speed and/or with rapid acceleration, such as a flying drone, and also on a slow-moving object such as a balloon or a glider, without the need to alter any programming.

The device according to the invention can in principle be used on any object, for example on vehicles. In the case of an aerial vehicle, in particular a flying drone, with a device for ejecting a parachute, it is particularly beneficial if the device is embodied according to the invention. In this manner, high reliability with a simultaneously low weight is achieved.

The other object is attained according to the invention by a method of the type named at the outset in which a base within a housing of a device that is in particular embodied according to the invention is releasably fixed in place on a fixing means under tension of a spring element, whereupon the fixing means is released when a predetermined state occurs, whereupon the parachute is ejected out of the housing through an ejection opening by means of the base with an at least partial release of the spring element tension.

A method of this type is robust, repeatedly usable multiple times, and can be implemented independently from an energy supply of a vehicle on which the device is arranged.

Normally, the base is fixed in place at the bottom within the housing at an end of the housing opposite from the ejection opening and the fixing means is also located at the bottom end of the housing.

It is beneficial if characteristic data regarding an object to which the device is connected, in particular an acceleration, are measured and the fixing means is preferably released in an automated manner when the measured data exceed one or more defined permissible maximum values. Thus, damage can be prevented in a particularly effective manner when the object, for example an aerial vehicle, reaches an impermissible operating state.

It is advantageous that permissible maximum values are determined and stored in a data storage device in an automated manner during normal operation, whereupon measured data are compared with the stored data in order to identify an abnormal operating state. A self-learning method is thus achieved which can be implemented on widely varying aerial vehicles without manual adjustment, so that on the one hand an erroneous ejection of the parachute under permissible operating conditions can be avoided and, on the other hand, a reliable ejection of the parachute under impermissible operating conditions can also be ensured.

Figure 5:
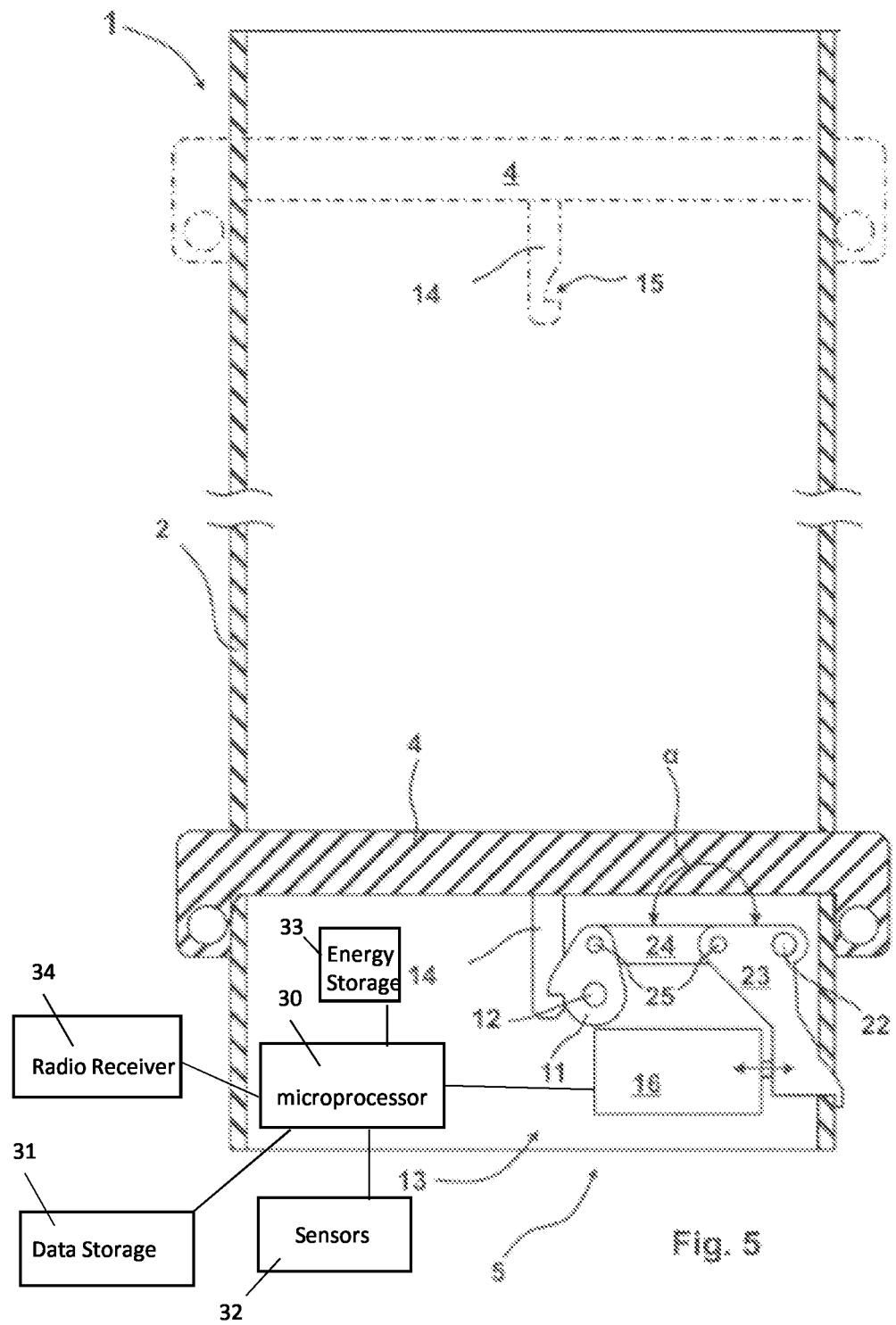
Figure 6:
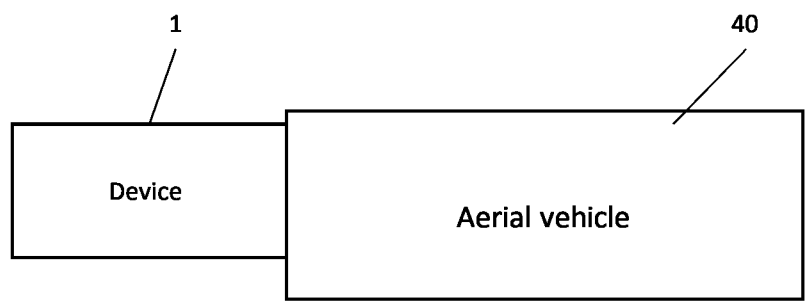

Additional features, benefits and effects of the invention follow from the exemplary embodiments described below. The drawings which are thereby referenced show the following:

FIGS. 1 through 4. A first exemplary embodiment of a device according to the invention in different views;

FIG. 5. A sectional illustration of a further device according to the invention; and FIG. 6. A schematic view of an aerial vehicle with the device according to the invention.

Figure 2:
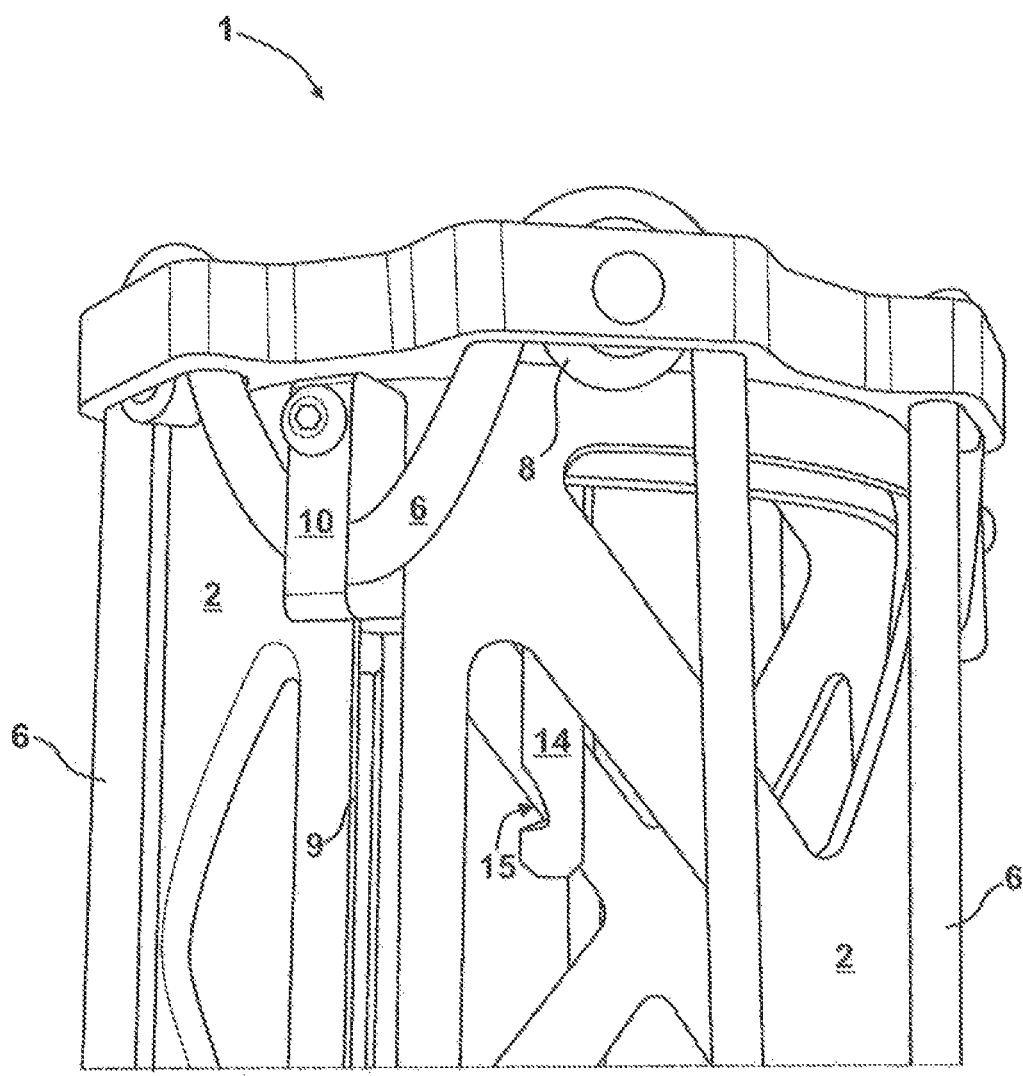
Figure 3:
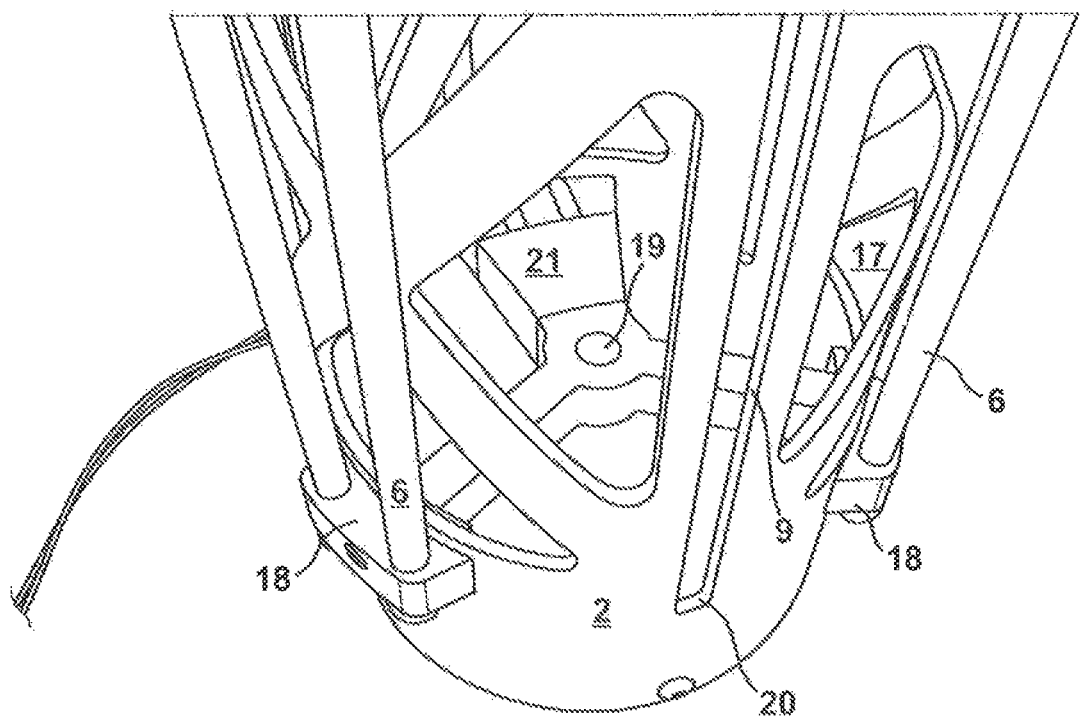
Figure 4:
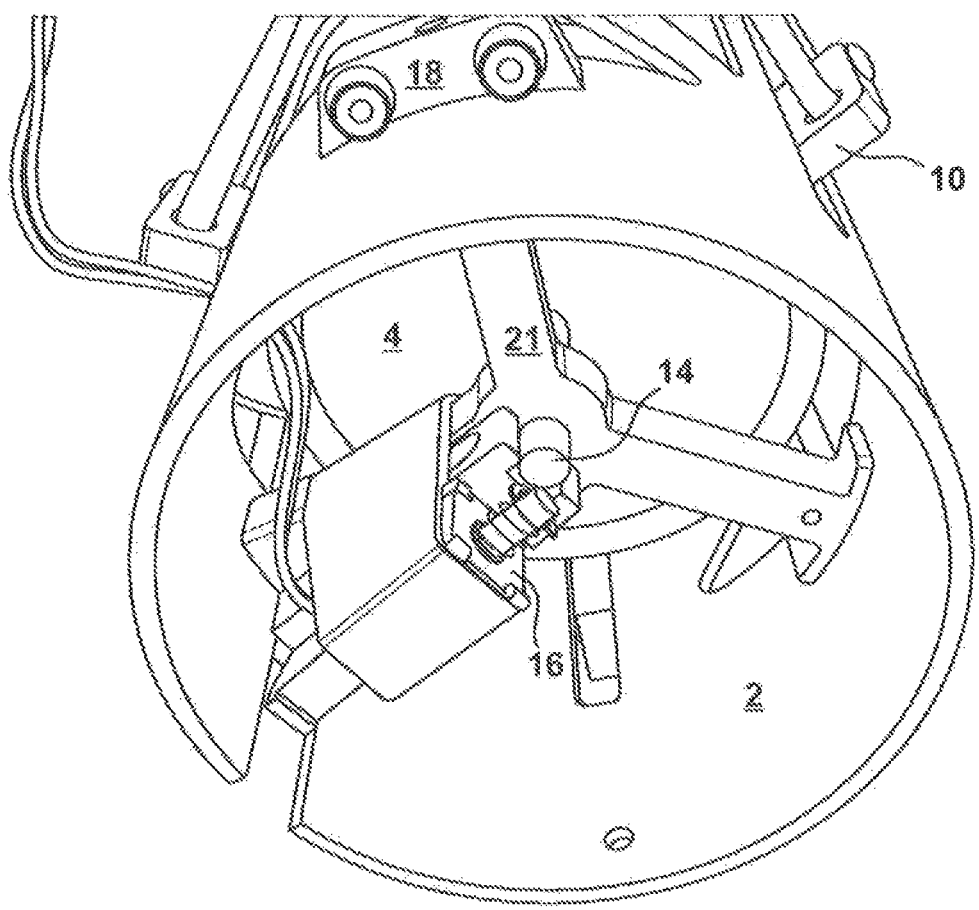

FIGS. 1 through 4 show a first exemplary embodiment of a device 1 according to the invention, wherein FIG. 1 shows the device 1 in an isometric illustration and FIGS. 2 through 4 show various details of the device 1. As can be seen, the device 1 comprises a roughly cylindrical housing 2 in which a base 4 can be moved between two end positions. The end positions are defined by stops 20 in guides 9 in which the base 4 is guided by guide pins 10 protruding out of the housing 2. The base 4 can be moved relative to the housing 2 between the end positions along the guide 9, wherein the base 4 is connected to the housing 2 via three spring elements embodied as elastic bands 6 such that a tension in the spring elements increases when the base 4 is moved from a region of an ejection opening 3 of the housing 2 or a top end of the housing 2 to an opposing bottom end of the housing 2 in order to tension the device 1. At the bottom end opposite from the ejection opening 3, the base 4 is fixed in place by the fixing means 5.

Using the fixing means 5, the base 4 can be releasably fixed in place within the housing 2 at the bottom end, wherein the fastening takes place in a form-fitting manner by means of a catch connected to an electromagnet 16, which catch engages in a notch 15 of a mandrel 14 connected to the base 4. The mandrel 14 is thereby accommodated in a mandrel guide 19 of a mount 21 positioned at the bottom end within the housing 2, which mandrel guide 19 is visible in FIG. 3. On the underside of the mount 21, the electromagnet 16 and catch are arranged.

In order to the release the fixing means 5, the electromagnet 16 is actuated so that the catch is released from the mandrel 14, whereby the base 4 is accelerated relative to the housing 2 towards the ejection opening 3 by means of an energy stored in the elastic bands 6. If a parachute, which is not illustrated, is at least partially located within the housing 2, the parachute is accelerated by the base 4 and ejected through the ejection opening 3.

As illustrated, the elastic bands 6 are connected to the housing 2 in a fixed manner on a band-fixing means 18 at the bottom end or at an end of the housing 2 opposite from the ejection opening 3, and are guided over a redirection means 7 positioned in the region of the ejection opening 3, which redirection means 7 comprises rollers 8. Furthermore, the elastic bands 6 are connected to the base 4 via guide pins 10 protruding out of the housing 2. This connection of the elastic bands 6 to the base 4 can also take place via a redirection means 7 or a fixed clamp on the guide pins 10. The elastic bands 6 are arranged in a stretched manner such that they also exhibit a tension when the base 4 bears against a stop 20 positioned in the region of the ejection opening 3. In this manner, an application of force to the base 4 via the elastic bands 6 is possible during a movement of the base 4 between the stops 20 or in the movement of the base 4 from one end of the housing 2 towards the ejection opening 3 located at the opposite end, whereby a high ejection velocity of a parachute transported with the base 4 can be achieved. This enables a safe landing even at low flying altitude.

With this embodiment, an elastic band 6 with a length required in order to apply an appropriate force can be used, despite the small size of the device 1. In addition, with this design the elastic band 6 only needs to be stretched by approximately 100% of an unstrained length of the elastic band 6 for a movement of the base 4 between the stops 20. If multiple redirection means 7 are used, smaller elongations of the elastic band 6 are also possible. Signs of fatigue in the elastic band 6 caused by strong stretching strains are thus avoided.

Furthermore, it can be seen that the housing 2 comprises openings 17 in addition to the guides 9, so that a particularly low weight of the device 1 is achieved. The housing 2 is normally composed of a lightweight material, for example plastic, in particular a fiber-reinforced plastic, and/or a carbon fiber composite material. The base 4 is likewise normally composed of a lightweight material such as plastic.

FIG. 5 schematically shows a section through a further device 1 according to the invention, which also comprises a roughly cylindrical housing 2. As illustrated, the fixing means 5 in this embodiment comprises a mechanism 13 which is connected to the electromagnet 16 on one side and to a form-fitting connecting means on the other side. The mechanism 13 comprises a transmission ratio so that a movement of the electromagnet 16 with large travel and a small force is translated into a movement of the form-fitting connecting means with less travel and a larger force. In the embodiment illustrated in FIG. 5, the form-fitting connecting means comprises a cam 11 that can rotate about a cam axis 12, which cam 11 engages in a notch 15 of the mandrel 14 connected to the base 4, in order to fix the base 4 in place in a form-fitting manner using the fixing means 5. In order to release the fixing means 5, the cam 11 is rotated via the mechanism 13 by the electromagnet 16 so that the mandrel 14 is freed. The mechanism 13 can be embodied as a lever mechanism and, as illustrated, can in particular comprise a toggle lever.

The toggle lever that can be actuated by the electromagnet 16 is thereby formed by a first lever 23 and a second lever 24, via which levers the cam 11 can be actuated. The mechanism 13 is positioned such that it can rotate relative to the housing 2 about the cam axis 12 and a lever axis 22. The first lever 23 connected to the electromagnet 16 is connected to the second lever 24 via a hinge 25. The second lever 24 is likewise connected to the cam 11 via a hinge 25. In a locked position such as the one illustrated, an angle $\alpha$ between the first lever 23 and the second lever 24 is slightly more than 180°. From this position, the first level 23 cannot be rotated further in a clockwise direction about the lever axis 22 because the toggle lever bears against a toggle lever stop formed, for example, by the electromagnet 16, and is thus locked in this direction.

An upwards force applied by the catch to the cam 11 is thus mechanically braced via the toggle lever stop or the electromagnet 16 positioned in a fixed manner within the housing, so that the toggle lever holds the base 4 against a spring force of the elastic bands 6 via the cam 11, even without an energy input. No electrical energy is therefore needed in the electromagnet 16 in order to hold the base 4.

When the fixing means 5 is released, the first lever 23 is rotated counterclockwise about the lever axis 22 by a brief actuation of the electromagnet 16, so that the toggle lever is moved below a dead center again into an unstable position, wherein the angle $\alpha$ is less than 180°. A subsequent complete opening or release of the fixing means 5 and the toggle lever takes place via the cam 11 and the spring force, so that after the toggle lever is unlocked or the toggle lever is moved into a position below dead center, basically no further energy needs to be supplied to the electromagnet 16.

Thus, in order to release the fixing means 5, only a brief energy pulse must be supplied to the electromagnet 16 to move the toggle lever from a stable position above dead center, in which the angle $\alpha$ is more than 180°, to an unstable position below dead center, in which the angle $\alpha$ is less than 180°.

Thus, with a minimal energy requirement and a very small force of the electromagnet 16, a reliable release of the fixing means 5 can be achieved by means of the transmission ratio of the mechanism 13, even with a particularly small size of the electromagnet 16. This enables a very lightweight design of the device 1. For aerial vehicles, a maximum flight time is typically limited by weight, which is why longer flight times can be achieved with a lightweight device 1.

In FIG. 5, the base 4 is also illustrated in a top-end position, into which the base 4 moves after a release of the fixing means 5 and an ejection of a parachute, which is not illustrated, when the base 4 bears against an upper stop 20 of the guide 9. From this position, the device 1 can be re-tensioned by a movement of the base 4 to a bottom end of the housing 2, at which bottom end the fixing means 5 is located. The parachute is typically attached to the device 1 by a cord or the like.

For the triggering of the electromagnet 16, a microcontroller 30 is provided which is connected to a data storage device 31 and sensors 32, such as accelerometers for example, so that the fixing means 5 can be released as a function of movements or accelerations of the device 1 in order to eject the parachute when an aerial vehicle 40 to which the device 1 is connected (see FIG. 6) enters an impermissible operating state, for example, if the aerial vehicle is in free fall.

The microcontroller 30 is thereby configured such that it stores data in the data storage device 31 during normal operation of the aerial vehicle 40 and maximum permissible values for a typical and/or permissible operating state can be derived therefrom. For this purpose, the microcontroller 30 can be selectively placed in a learning mode. A self-learning device 1 that can be adapted in a simple manner to widely varying aerial vehicles 40 is thus achieved. Particularly in light of a greatly increasing variety of aerial vehicle variants, such as unmanned flying drones, this is beneficial for the ability to retrofit widely varying flying drones with the device 1 in a simple manner.

It is beneficial if a radio receiver 34 is provided and is connected to the fixing means 5 such that the fixing means 5 can be released by means of a radio signal. Thus, in the case of a remote-controlled flying drone, the parachute can easily be triggered by manual or automated remote control if, for example, it is foreseeable that damage would otherwise be unavoidable.

With the device 1 according to the invention and the corresponding method, a reliable triggering of a parachute is reliably possible in a space-saving and weight-reducing manner, so that flying drones in particular can be lowered to the ground 4 in an automated and reliable manner when, for example, a propulsion system fails or the flying drone is caught by a wind gust.

As a result, damage to the flying drone and to objects on the ground can be avoided, as can injuries to people on the ground caused by flying drones descending uncontrollably.

Furthermore, because of the low weight compared to devices 1 from the prior art, a particularly long flight time of the flying drone is possible. As a result of the simple structure, the device 1 can be produced cost-effectively, so that existing flying drones can be retrofitted with a device 1 according to the invention at low cost in order to enable safe flight operation.

The invention claimed is:

1. A device for ejecting a parachute, comprising:
a housing with an ejection opening, the housing being suitable for at least partially accommodating the parachute,
a movable base is arranged within the housing, and is connected to the housing via at least one spring element,
a fixing device, wherein the base is releasably fixed in place within the housing using the fixing device,
wherein, when the parachute is arranged within the housing and the fixing device is released, the base is accelerated by the at least one spring element so that the parachute is ejected through the ejection opening by the base,
wherein the at least one spring element, which comprises an elastic band, has a pre-tension at each position of the base.

2. The device according to claim 1, wherein the elastic band comprises a rubber band.

3. The device according to claim 2, wherein the elastic band is guided over a redirection element comprising a roller.

4. The device according to claim 1, wherein the base is movable relative to the housing between two end positions.

5. The device according to claim 1, further comprising guide pins connected to the base, wherein the at least one spring element is arranged on an outside of the housing and is connected to the base via the guide pins, which are guided in guides of the housing and protrude out of the housing.

6. The device according to claim 1, wherein the housing is embodied in a roughly cylindrical manner and the at least one spring element comprises multiple spring elements distributed at regular intervals over a circumference.

7. The device according to claim 1, wherein the fixing device comprises at least one of a catch or a cam configured to engage in a corresponding notch in order to hold the base against a tension of the at least one spring element.

8. The device according to claim 1, further comprising an electromagnet configured to release the fixing device.

9. The device according to claim 1, further comprising a lever mechanism configured to release the fixing device.

10. The device according to claim 9, wherein the lever mechanism comprises a toggle lever.

11. The device according to claim 1, further comprising an energy storage device arranged so that an external energy supply is not required to release the fixing device.

12. The device according to claim 1, further comprising a radio receiver connected to the fixing device such that the fixing device is releasable via a radio signal.

13. The device according to claim 1, further comprising at least one accelerometer operatively connected to the fixing device to release the fixing device an acceleration exceeds a defined value is measured.

14. The device according to claim 1, further comprising a data processing device configured for automated release of the fixing device.

15. The device according to claim 14, wherein the data processing device comprises a data storage device storing maximum value data, and the device further comprises
sensors for measuring current corresponding data during operation, wherein the fixing device is releasable when the data processing device determines that measured current corresponding data exceeds the stored maximum value data.

16. The device according to claim 15, wherein the data processing device is configured to determine and store data that occurs during normal operation of an object to which the device is connected.

17. The device according to claim 16, wherein the maximum value data comprises maximum acceleration data, and the data processing device is configured to determine and store maximum acceleration data.

18. An aerial vehicle comprising the device according to claim 1 for ejecting a parachute.

19. The aerial vehicle according to claim 18, wherein the aerial vehicle is a drone.

20. A method for ejecting a parachute from the device according to claim 1, in which the base is releasably fixed in place by the fixing device under tension of the at least one spring element, the method comprising:
releasing the fixing device when a predetermined state occurs, whereupon the parachute is ejected by the base out of the housing through the ejection opening by an at least partial release of spring element tension,
wherein the base is moved to an end position and the spring element is held at each position of the base under a pre-tension.

21. The method according to claim 20, further comprising measuring characteristic data regarding an object to which the device is connected and
releasing the fixing device when the measured characteristic data exceed one or more defined permissible maximum values.

22. The method according to claim 21, wherein, in an automated manner, the permissible maximum values are determined and stored in a data storage device during normal operation, and the method further comprises:
comparing the measured characteristic data with the stored data in order to identify an abnormal operating state.

23. The method according to claim 21, wherein the releasing of the fixing device occurs in an automated manner when the measured characteristic data exceed the one or more defined permissible maximum values.

* * * * *